G. W. MANSON.

Improvement in Motors for Sewing-Machines.

No. 5,038. Reissued Aug. 20, 1872.

Witnesses:

Augustus H. Girard

J. Wesl. Wagner.

Inventor:

George W. Manson

By Johnson, Klaueke & Co his Attorneys

AM. PHOTO-LITHOGRAPHIC CO. N.Y. (OSBORNE'S PROCESS.)

UNITED STATES PATENT OFFICE.

GEORGE W. MANSON, OF NEW YORK, N. Y., ASSIGNOR, BY MESNE ASSIGNMENTS, OF THREE-FOURTHS OF HIS RIGHT TO THOMAS D. HARRISON.

IMPROVEMENT IN MOTORS FOR SEWING-MACHINES.

Specification forming part of Letters Patent No. 121,638, dated December 5, 1871; reissue No. 5,038, dated August 20, 1872.

CASE A.

*To all whom it may concern:*

Be it known that I, GEORGE W. MANSON, of the city, county, and State of New York, have invented a new and useful Improvement in Operating Sewing-Machines, of which the following is a specification:

My invention relates to motors for operating sewing-machines; and my improvements consist in combining with the frame of a sewing-machine a new and simple means for winding up the coiled spring, from which, through suitable gearing, motion is imparted to the pulley or hand-wheel shaft of the machine, the winding device being more simple and certain, and rendering the operation noiseless, while serving also as a lock to prevent the unwinding of the spring without the use of a ratchet-wheel and spring-pawls for that purpose. My improvement also consists in the construction of the brake, whereby a much finer adjustment of its operation is attained, and the motion of the needle-arm more easily and readily controlled, either to stop and start its motion altogether or to regulate the speed thereof to suit the work and the requirements of the operator.

Figure 1:
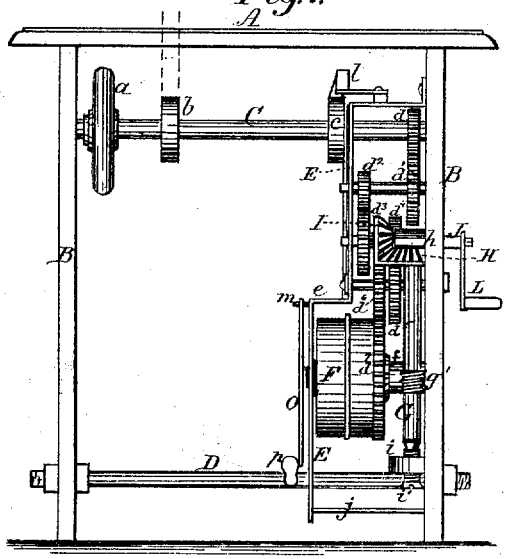
Figure 2:
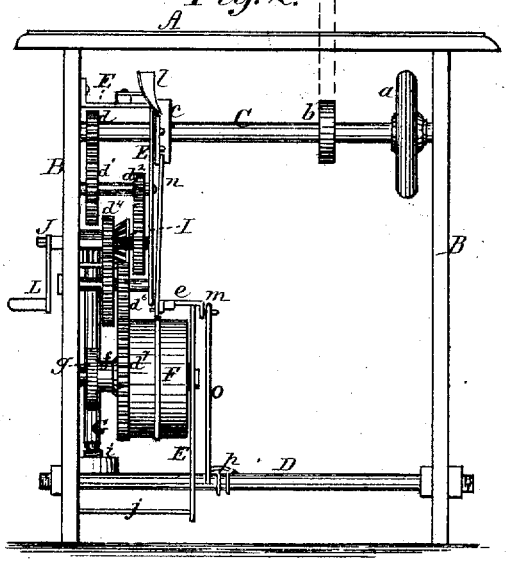
Figure 3:
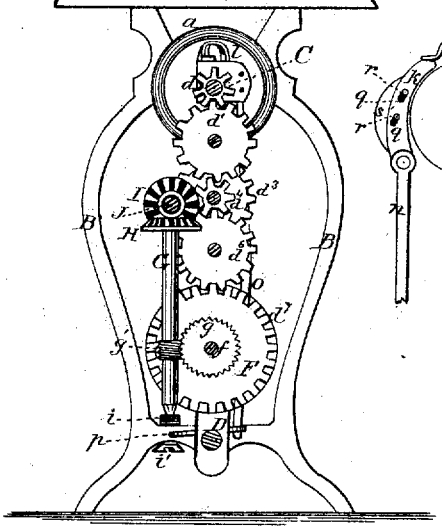
Figure 5:
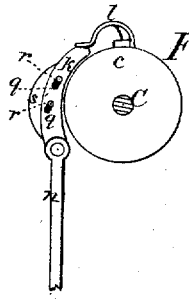
Figure 4:
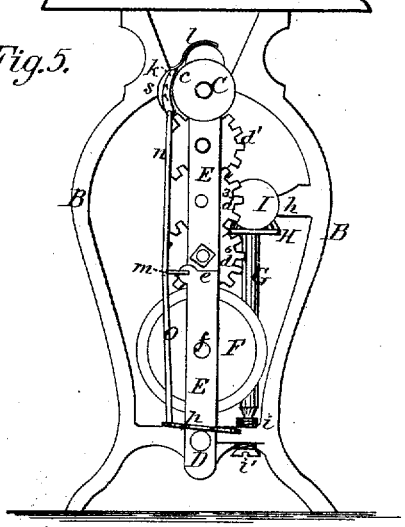

In the accompanying drawing, Figure 1 represents a front elevation of a sewing-machine table and frame with my improvement attached thereto. Fig. 2 is a rear elevation of the same. Fig. 3 is an end view of the same, one end of the frame being removed. Fig. 4 is a similar view from the opposite end, and Fig. 5 is a detached enlarged view of the brake.

Between the two frames or standards B of a sewing-machine table, A, and at a suitable distance below said table, revolves, in suitable bearings, the shaft C, carrying the hand, belt, and brake-wheels *a b c*, respectively, and the gear-wheel *d*. The frames B, at their lower ends, are held together by a bar or rod, D, which supports an additional standard, E, through the upper end of which the shaft C passes, and which, a little above the shaft C, is bent at right angles, and is then secured to the standard B. This standard E is bent at *e* at right angles, so that its lower portion is further away from the nearest standard B than its upper portion, whereby space is obtained for the spring-case and gear-wheel without a consequent lengthening of the shafts of the gear-wheels $d^1$, $d^2$, $d^3$, $d^4$, $d^5$, and $d^6$, through which gear-wheels, and the gear-wheel *d* on shaft C, motion is imparted to the latter from the spring-case F, which carries a gear-wheel, $d^7$. The coiled spring is attached by its outer end to the inner periphery of the case F, and with its inner end to the shaft *f*, on which the case F revolves freely. On the shaft *f*, outside of the case, and between it and the standard B, is keyed a worm gear-wheel, *g*, gearing with a worm, *g'*, on a vertical shaft, G, which is stepped in bearings *h i*, formed or secured to the standard B. The step *i'* of shaft G, in the lower bearing *i*, is made to screw up or down, so as to allow of a ready removal of the shaft for the purpose of cleaning it and the worm, or to facilitate the access to the other parts. The shaft G, at its upper end, carries a horizontal beveled cog-wheel, H, gearing with a vertical beveled cog-wheel, I, secured on the end of the shaft J, which, passing through, and having its bearings in the standard E and cross-piece *h* of the standard B, is provided with a crank-handle, L. Additional rigidity is given to the standard E by means of a rod, *j*, connecting the lower end, which extends below rod D to the lower end of the standard B. The shafts of the gear-wheels $d^1$ $d^2$ $d^3$ $d^4$ $d^5$ $d^6$ have their bearings in the standards B and E, and are are arranged above each other at proper distances to allow of the free revolution of the gear-wheels with the least amount of friction.

It will be seen that the worm-gear *g* and *g'* allow the spring to be easily wound up by the bevel-gear H and I; but as the spring cannot turn the worm-gear backward, it cannot, therefore, unwind through said worm-gear, but must remain in a locked position with the shaft *f* at whatever point of force the spring may be wound, thereby dispensing with the ratchet-wheel and spring-pawls on the winding-shaft for that purpose. The winding device, by this means, serves also to lock the spring against the possibility of its turning the winding-crank backward, the spring being held as it is wound up by brake *k*, which holds the train of gear and spring-case while winding the spring. In its normal condition the brake *k* is held against the brake-wheel *c* on shaft C, by a spring, *l*, one end of which is secured on standard E, while the free end forcibly presses the brake *k* into frictional contact with wheel *c*. This brake is pivoted with its lower end to a rod, *n*, the lower end of which is again pivoted to one branch of a double rock-arm, *m*, pivoted to the bent part *e* of standard E, and the other arm of which has its bearing in the upper end of a rod, *o*, the lower end of which is pivoted to a treadle, *p*, made to vibrate on the rod D. The brake *k* is provided with one or two inclined slots, *q*, through which pass pins *r* from an arm, *s*, of standard E; and as the brake is moved up and down these pins *r* move it against or from the brake-wheel *c*. These slots are so arranged in relation to the face of the brake and the periphery of the brake-wheel *c* that the elevation of the brake does not suddenly but only gradually relieve the friction of the brake on the wheel. Thus it will be seen that by pressing the treadle down at the heel the brake will be raised against its spring and away from the brake-wheel, and will remain off as long as and while the treadle is pressed down, and the brake will be put on and the machine stopped whenever the foot is removed from the treadle.

The operation of my improved winding apparatus is as follows: The small crank-handle L is placed in position on its short shaft J and operated, thereby revolving the vertical shaft G, and through the worm *g'* on the latter, and the worm gear-wheel *g* on the shaft *f*, and winding upon this shaft the coiled spring. If it is not desired to wind up the spring to its full capacity, the winding may be arrested at any time, and as the worm gear-wheel *g* cannot operate the worm *g'* on the shaft G, neither ratchet nor pawl are required to hold the parts at any point of the winding, thus rendering the operation of winding the spring entirely noiseless, the brake being on during this operation, and holding through the several gear-wheels the case F, thus preventing the latter from revolving while the spring is being wound up. This having been accomplished, the crank-handle L is removed and put away, and the machinery may be operated by pressing down the treadle and thus removing the pressure of the brake. The coiled spring is then free to operate the case, and through it the gear-wheels revolve the shaft C and operate the machine. As the handle L can be removed whenever the spring has been coiled and placed out of the way, no lever or equivalent device for the operation of the spring is on the outside of the frame or above the table of the machine, while all the operating mechanism is confined to one end of the frame. In machines standing on cases with doors and drawers, the drawers may be on one side and the operating mechanism on the other, leaving sufficient room for the limbs of the operator and for the brake. The brake being susceptible of a very fine adjustment in regard to its frictional operation on the brake-wheel *c*, enables the operator to regulate the speed of the motion of the needle-bar without any loss of power or the necessity of interrupting the operation of the machine; and although this result, by great practice, might be obtained by means of any friction-brake, yet the peculiar construction by which this fine adjustment is attained, renders it almost a matter of intuition to operate the brake in relation to the speed of the needle-bar.

Having described my invention, I claim—

1. In combination with the frame B E, and the pinion *d* on the pulley or hand wheel shaft C of a sewing-machine, the train of gear and the winding worm gear-wheel *g* and worm *g'*, and bevel-gear wheels H and I, operated by a crank-handle, L, arranged to wind up and hold the spring, as described.

2. In a sewing-machine, the brake *k*, provided with an inclined slot or slots *q*, spring *l*, and the arm *s* of the standard E having pins *r r*, in combination with the brake-wheel *c* on the shaft C, arranged and operating substantially as described.

3. In combination with the brake *k*, arranged as described, the spring *l* and brake-wheel *c*, the rods *n o*, double rock-arm *m*, and treadle *p*, all arranged to operate as herein described and shown.

GEORGE W. MANSON.

Witnesses:

CHAS. M. MARSH,

J. W. VANDEWATER.